Feb. 13, 1962   W. O. SHERMAN, JR   3,021,155
HOUSE MOVING UNIT
Filed Dec. 18, 1958   4 Sheets-Sheet 4
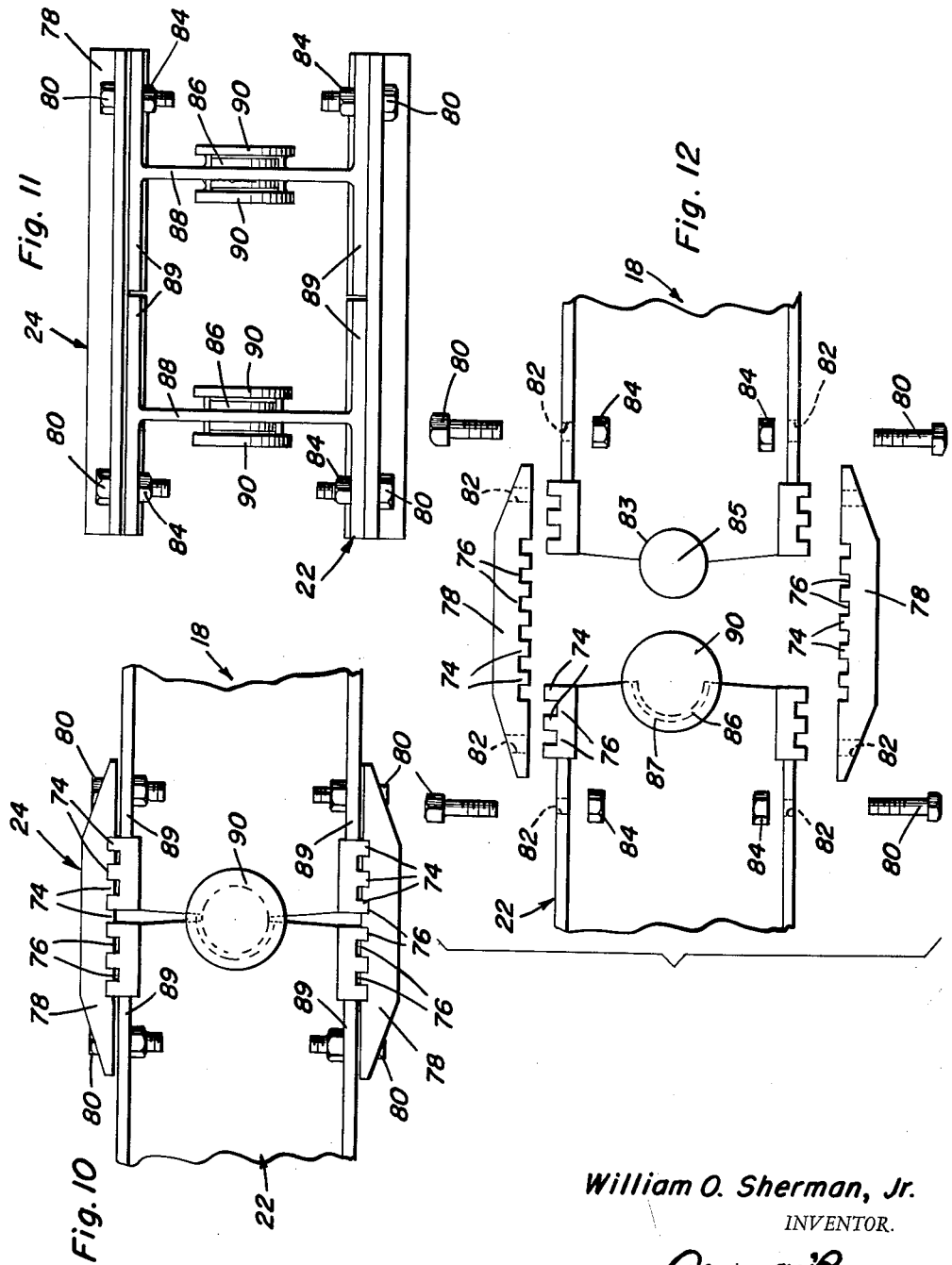
William O. Sherman, Jr.
INVENTOR.

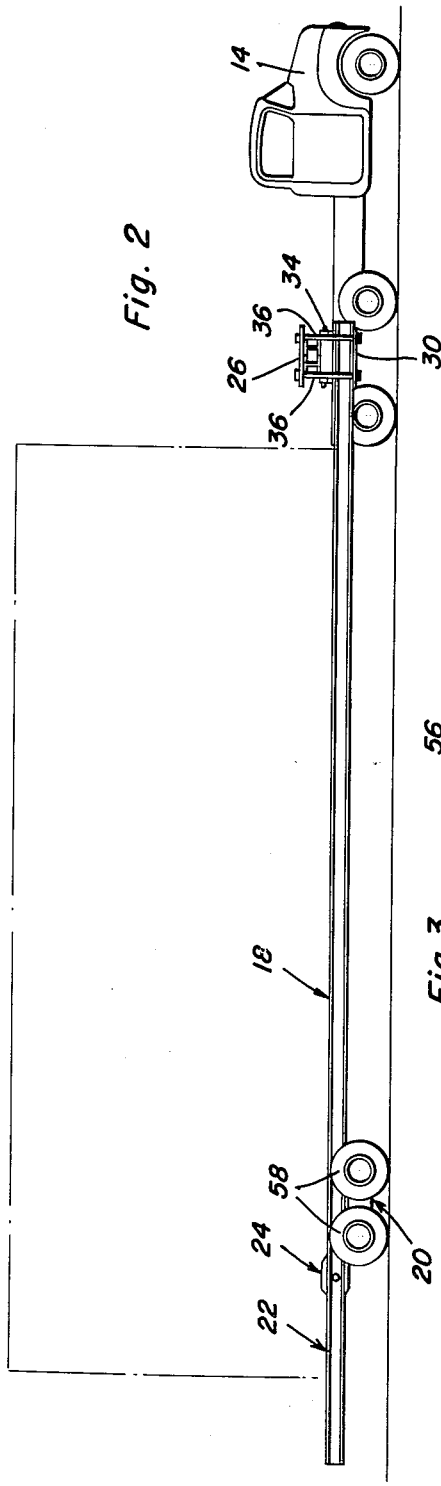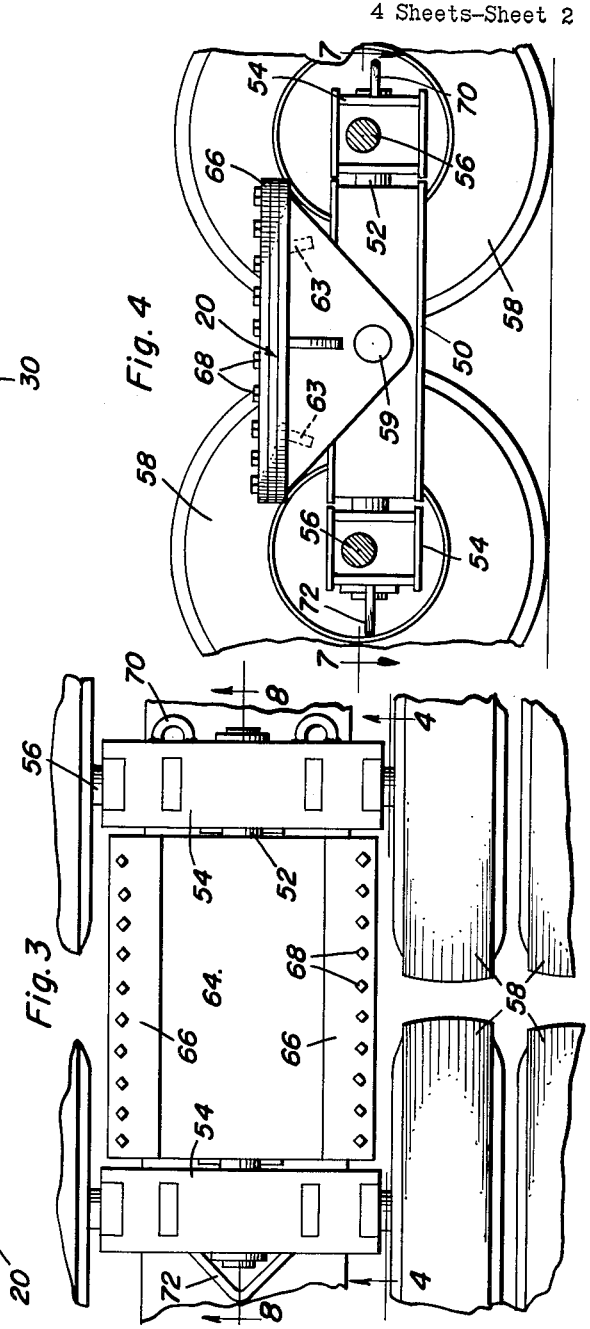
Fig. 2
Fig. 3
Fig. 4
William O. Sherman, Jr.
INVENTOR.

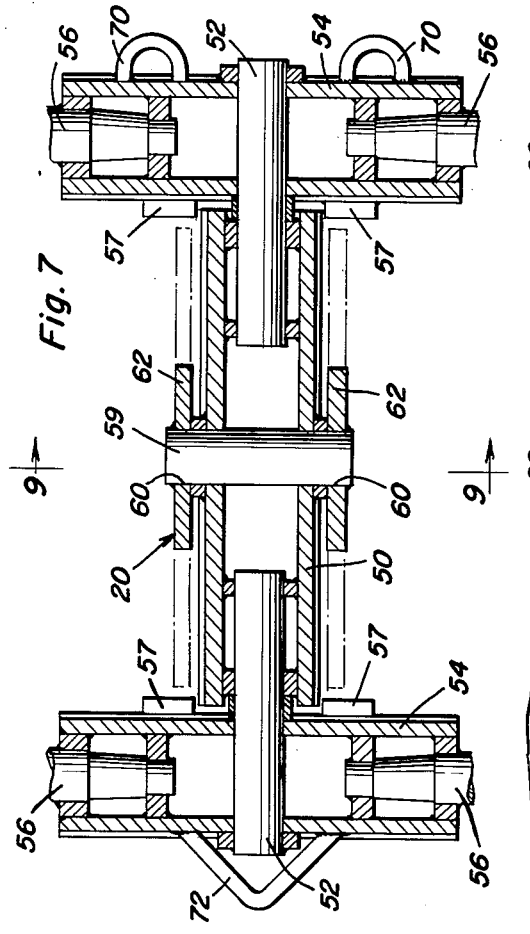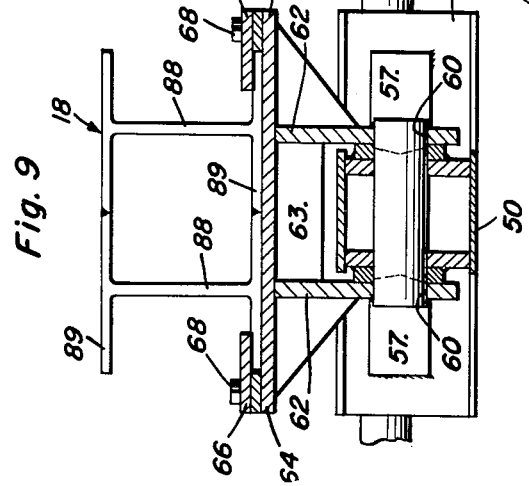

United States Patent Office 3,021,155
Patented Feb. 13, 1962

3,021,155
HOUSE MOVING UNIT
William O. Sherman, Jr., Bayside, Va., assignor to Norfolk Iron & Wire Works, Inc., Norfolk, Va., a corporation of Virginia
Filed Dec. 18, 1958, Ser. No. 781,257
5 Claims. (Cl. 280—423)

This invention relates to a device for moving heavy and bulky loads from one place to the other, and more particularly relates to a device for supporting a house during the transportation of the same from one place to another using a novel three point suspension system.

The main object of this invention is to provide a trailer for moving houses, which because of its three point suspension system, will transport a house without subjecting the same to undue torsional stresses.

A further object of this invention, in accordance with the preceding object, is to provide a trailer for moving houses which shall be capable of transporting the house over other than smooth road surfaces in a manner which will not subject the house to an unnecessary amount of shock due to the surface of the terrain over which it is being transported.

A further object of this invention, in accordance with the preceding objects, is to provide a trailer which has longitudinally extending load beams that will remain parallel in relation to each other regardless of the relative elevation of the three supporting points.

A still further object of this invention, in accordance with the preceding objects, is to provide a trailer fifth wheel connector assembly which will enable the forward-most transversely extending beam of the trailer to pivot about a horizontal axis extending longitudinally of the trailer.

A final object of this invention, in accordance with the preceding objects, is to provide a trailer having longitudinally extending load beams that may be quickly extended in length with the addition of beam extensions which are connected through the use of a novel and useful splice for joining two beam members which may be subjected to bending stresses.

These together with other objects and advantages which will become subsequently apparent reside in the details of construction and operation as more fully hereinafter described and claimed, reference being had to the accompanying drawing forming a part hereof, wherein like numerals refer to like parts throughout, and in which:

FIGURE 2 is a side elevational view of the invention as shown in FIGURE 1;

FIGURE 3 is an enlarged top plan view of one of the supporting wheel trucks of the trailer, with a longitudinally extending load supporting beam of the trailer shown in phantom lines thereon;

FIGURE 4 is an enlarged vertical sectional view of one of the wheel supporting trucks taken substantially upon the plane indicated by the section line 4—4 of FIGURE 3;

FIGURE 5 is an enlarged fragmentary vertical transverse sectional view of the fifth wheel connector assembly of the trailer shown secured to the forward transverse load beam thereof, and with parts of the beam being broken away being taken substantially upon the plane indicated by the section line 5—5 of FIGURE 1 and with the tractor fifth wheel assembly being omitted;

FIGURE 6 is an enlarged vertical sectional view taken substantially upon the plane indicated by the section line 6—6 of FIGURE 5;

FIGURE 7 is an enlarged horizontal sectional view taken substantially upon the plane indicated by the section line 7—7 of FIGURE 4, with parts of the wheel supporting stub axles being broken away;

FIGURE 8 is an enlarged vertical sectional view taken substantially upon the plane indicated by the section line 8—8 of FIGURE 3;

FIGURE 9 is an enlarged vertical sectional view taken substantially upon the plane indicated by the section line 9—9 of FIGURE 7;

FIGURE 10 is an enlarged side elevational view of one of the longitudinally extending load supporting beams, shown with an extension beam secured thereto by a connecting splice in accordance with the invention and with parts of the beams being broken away;

FIGURE 11 is an enlarged end elevational view of one of the load supporting beams with an extension beam secured thereto; and FIGURE 12 is an enlarged exploded detail view of the splice connecting means used to secure the extension beams to the longitudinal load beams, portions of the beams being broken away.

Figure 1:
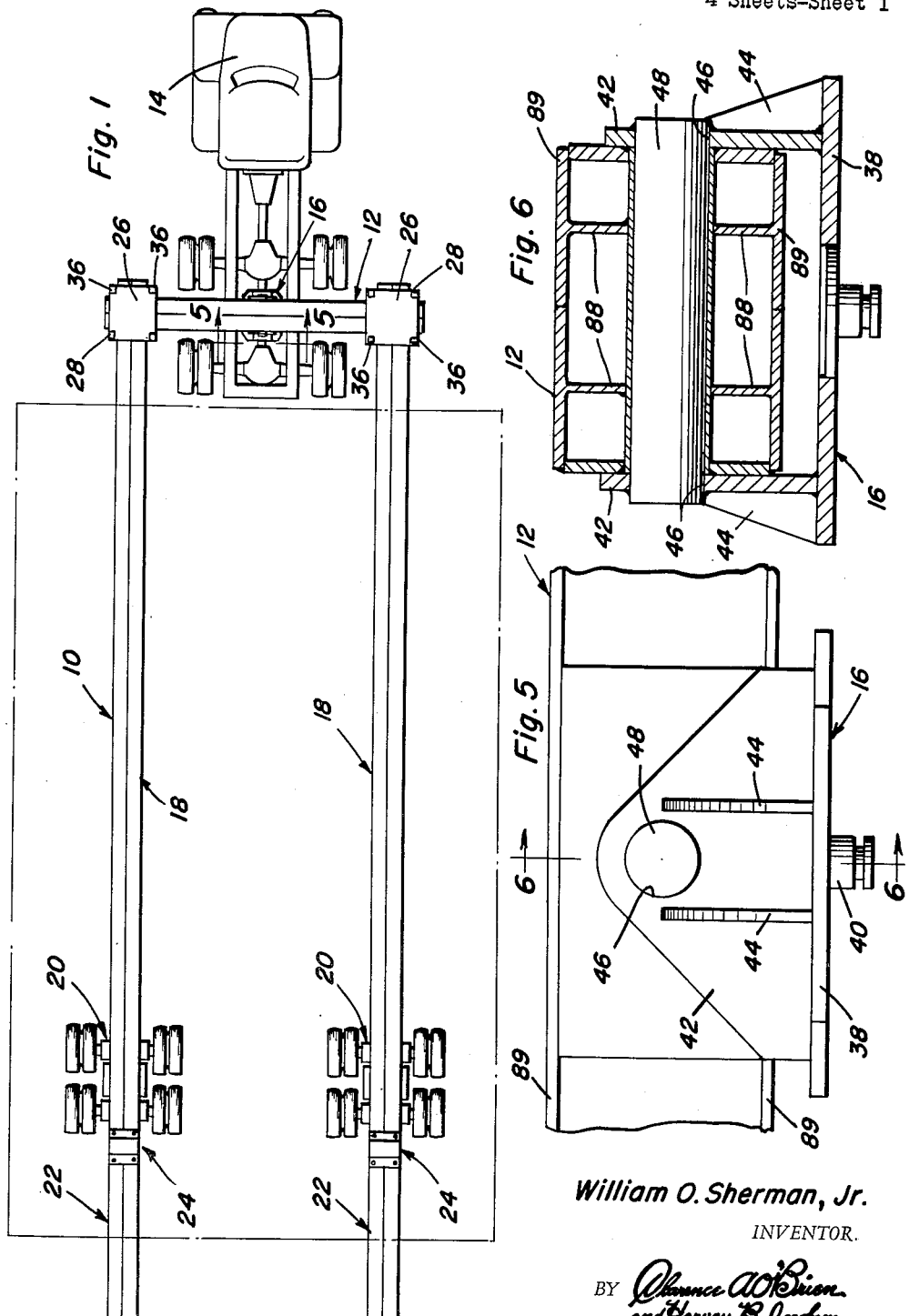
FIGURE 1 is a top plan view of a trailer in accordance with the invention, shown connected to the rear of a tractor truck and with the outline of a house shown in phantom lines.

Referring now more specifically to the drawings the reference numeral 10 generally designates the trailer embodying the invention comprising a forward transverse load supporting beam 12 mounted upon the fifth wheel assembly (not shown) of a tractor 14, and a connector assembly generally designated by the reference numeral 16, to be more specifically described hereinafter. Rearwardly extending horizontal load beams 18 are each connected at their forward ends to an end of the forward load supporting beam 12, and are supported at their rearward ends by wheel dollies generally designated each by the reference numeral 20 hereinafter to be fully described. Attached to the rear end of each of the rearwardly extending load beams is an extension beam 22. A connecting splice, generally designated by the reference numeral 24, is used to connect the extension beams 22 to the load beams 18 and is hereinafter to be fully described.

The connection of the forward end of each of the rearwardly and longitudinally extending load beams 18 to an end of the forward transversely extending load beam 12, is achieved by the placement of a rectangular top plate 26 above the overlapped joint of the forward beam 12 on the rearwardly extending beams 18 seen at 28 in FIGURE 1 and the securement thereof to a rectangular lower plate 30 placed below the overlapped joint as seen in FIGURE 2, with a wood blocking 34 disposed between the beams, by means of bolts 36.

Connector assembly

The connector assembly 16 comprises a base member 38 from which depends a standard trailer kingpin 40 for the connection of a trailer to the fifth wheel assembly of the tractor 14. Rising from base member 38 are a pair of vertical support members or plates 42 each having a pair of buttresses 44. Formed horizontally through support members 42 are transversely aligned bores 46 through which are secured the ends of a longitudinally extending beam shaft 48 which is journaled transversely through the forward load supporting beam 12. It may now be seen that the forward load supporting beam 12 is pivotally mounted upon the connector assembly 16 for rotation about a horizontal axis extending longitudinally of the trailer.

Supported wheel dolly

The supporting wheel dolly generally designated by the reference numeral 20 comprises an elongated box-like body beam 50 which cextends longitudinally of said trailer, having longitudinally extending shafts 52 secured through the ends thereof which support and are journaled transversely through the mid-portions of axle beams 54 which pivotally connect the latter to the body beams 50 for movement about a horizontal axis extending longitudinally of said trailer. In turn, journaled in and extending from both ends of axle beams 54 are stub axles 56 which support at their outwardmost ends the wheels 58 of each dolly 20. Secured to the confronting surfaces of axle beams 54 in spaced and overlying relation to the ends of body beam 50 are stops 57 which are located upon the confronting surfaces of axle beams 54 so as to limit the pivoting movement thereof with respect to the beam 50.

Journaled transversely through the body beams 50 at the midportions thereof are support shafts 59 which are secured through horizontal aligned bores 60 formed through support plates 62 which are connected to and support at their upper ends the horizontal support member 64, whereby the horizontal support member is pivotally mounted upon the dolly 20 for pivotal movement about a horizontal axis extending transversely of the of the trailer frame.

The rearwardly extending load beam 18 is secured to the horizontal support member 64 by means of an inwardly projecting flange 66 which extends along the top surface of the support member 64 at the sides thereof which are secured thereto by means of flange bolts 68.

It may be seen that the wheel trucks or dollies 20 may be secured longitudinally along the rearwardly extending load beams 18 at any point intermediate the ends thereof. Provided on the forwardmost side of the forward axle beams 54 are tow eyes 70 and provided on the rearmost surface of each rear axle beam 54 is a tow bar 72. The tow eyes 70 and the tow bar 72 are placed to facilitate the longitudinal movement of the dollies 20 in respect to the rearwardly extending load beams 18.

It can now be seen that the horizontal support members 64 are pivotally mounted upon the dollies 20 for pivotal movement about horizontal axes extending transversely of the rearwardly extending load beams 18, and that the axle beams 54 which carry the wheel support stub axles 56, are pivotally mounted upon the dollies 20 for pivotal movement about horizontal axes extending longitudinally of the rearwardly extending load beams 18. Secured to and depending from horizontal support member 64 and disposed between support plates 62 are stop plates 63 positioned to limit the rotation of support member 64 about its transversely extending horizontal axis. Since the horizontal support member 64 of each of the dollies 20 is able to pivot in respect to the wheels about axes extending longitudinally and transversely of the rearwardly extending load beams 18, it can be seen that each of the dollies 20 supports the load of the trailer at only one point with a universal action. The universal action of the dollies 20 coupled with the pivotal movement of the forward load supporting beam 12 about a horizontal axis extending transversely of the trailer enables a load carried by the trailer to be supported by a three point loading system. In the three point loading system, if one of the supporting points becomes lower than the other two, the rearwardly extending load beams remain parallel which enables a load to be carried by the trailer over relatively rough ground without subjecting the objects being carried by the trailer to torsional stresses.

Conveniently, the load beams 12 and 18 and the extension beams 22 each may be constructed by placing a pair of "I" beams in side by side relation with the beams of each pair being secured together in a suitable manner, such as welding, resulting in a single beam having upper and lower horizontal flanges 89 with upright web portions 88 disposed therebetween intermediate the ends thereof.

*Connecting splice*

The connecting splice, generally designated by the reference numeral 24 comprises a series of alternating projections 74 and recesses 76 formed on opposite surfaces of the rearwardly extending load beams 18 and the corresponding surfaces of the extension beams 22, which are spaced from the confronting and aligned ends thereof. Pairs of cap plates 78 having complementary projecting 74 and recesses 76 are secured in overlapping relation upon the aligned and adjacent ends of the beam 18 and the extension 22 by means of splice bolts 80 which are passed through aligned apertures 82 and secured by means of nuts 84.

On the rear end of each web 88 of the beams 18 are formed notches 83 which have secured therein a short horizontal and transversely extending shear plate 85. On the forward end of each upright 88 of the extension beams 22, in corresponding relation to notch 83 are formed notches 87 having semi-circular transversely extending flanges 86 secured thereto which extend beyond the side surfaces of the beam webs 88 and have at their outer ends circular cap plates 90. When the aligned ends of the beams 18 and 22 are in abutting relation, the shear plates 85, carried by and secured within notches 83 are received within the pockets formed by the semi-circular flanges 86 and the circular cap plate 90. The cap plates 78, secured in overlapping relation to the ends of the beams also secure the extension beams 22 to the ends of the rearwardly extending beams 18 by means of a quick detachable splice including the above mentioned projections 74 and recesses 76, which provide a novel and useful way of joining two members subject to bending stresses.

In moving the house from one position to another, should either of the wheel dollies 20 assume an elevation below that of either the other dolly or the point at which the forward load supporting beam 12 is pivoted, the forward load supporting beam 12 will merely pivot about its midpoint lowering its ends which is connected to the horizontal rearwardly extending load beam 18 that is supported by the dolly which has attained the point of lower elevation which will maintain the two horizontal rearwardly extending load beams in parallel relation to each other. Thus, a house supported by the trailer 10 will not be subjected to torsional stresses.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A house moving trailer comprising a forward transversely extending horizontal load beam, a fifth wheel connector assembly supporting the latter and adapted for support upon a fifth wheel of a tractor vehicle, means pivotally mounting said horizontal load beam to said fifth wheel connector assembly for movement about a horizontal axis extending transversely of said load beam, two rearwardly extending, substantially parallel, horizontal load beams, means connecting the latter at their forward ends to the ends of said forward beam, a pair of wheel support means each connected to and supporting the rearward portion of one of said parallel load beams, each support means having a supporting surface engaging and supporting one of said parallel beams, said support means including pivoted members having said supporting surfaces thereon and being disposed for rotation about horizontal axis extending longitudinally and transversely of said horizontal beams, a pair of extension beams, means connecting one end of said extension beams to the rearwardmost end of one of said parallel load beams with the adjacent ends of said extension and load beams being in aligned abutting relation, said load beams and said extension beams each comprising upper and lower horizontal longitudinally extending flanges having at least one vertical longitudinal extending web portion secured therebetween intermediate the side edges thereof, said connecting means including aligned notches formed in the confronting ends of said web portions with one of said notches having secured therein a semi-circular transversely extending flange and a transversely extending shear plate receivable in said first mentioned notch and secured within the other notch, and fastening means removably secured to the outer surfaces of the confronting ends of said flanges in overlapped relation.

2. The combination of claim 1 including a series of longitudinally spaced alternating projections and recesses on said outer surfaces of said longitudinally extending flanges, a pair of cap plates each having complementary projections and recesses therein, a pair of bores through each of said flanges in spaced relation from the confronting ends thereof, and a pair of bores formed in each end of said plates registrable with said first mentioned bores, said fastening means including said plates disposed in overlapping relation upon the aligned and adjacent ends of said beams and secured thereto with the recesses and projections of said plates engaging the projection and recesses of said beams respectively.

3. A house moving trailer comprising a forward transversely extending horizontal load beam, a fifth wheel connector assembly supporting the latter and adapted for support upon a fifth wheel of a tractor vehicle, means pivotally mounting said horizontal load beam to said fifth wheel connector assembly for movement about a horizontal axis extending transversely of said load beam, two rearwardly extending substantially parallel, horizontal load beams, means connecting the latter at their forward ends to the ends of said forward beam, and with the remainder of said load beams being free of connections to each other, a pair of wheel support means each connected to and supporting the rearward portion of one of said parallel load beams, each support means having a supporting surface engaging and supporting one of said parallel beams, said support means including pivoted members having said supporting surfaces thereon and being disposed for rotation about horizontal axes extending longitudinally and transversely of said horizontal beams, a body beam extending longitudinally of said trailer, a horizontal support shaft journaled transversely through the midportion thereof, a pair of horizontal longitudinally extending shafts having one end of each rigidly secured in said body beam and the other end projecting through the ends of the latter, a pair of axle beams each having one of said shafts journaled transversely through the midportion thereof, two pairs of stub axles, each having an end thereof rigidly secured in one of the ends of said axle beams and the other end projecting therefrom, wheels rotatably mounted on each projecting end of said stub axles, and a support surface adapted to engage one of said longitudinally extending load beams pivotally mounted on said support shaft for pivotal movement thereabout.

4. In the combination of a trailer having a forward transversely extending horizontal load beam having means thereon for securing said beam to a fifth wheel of a tractor for movement about a horizontal axis extending transversely of said beam and a pair of rearwardly extending longitudinal load beams secured at their forward ends of opposite ends of said transverse beam and free of connections with each other rearwardly of said transverse beam each longitudinal beam having upper and lower horizontal longitudinally extending flanges and at least one longitudinal extending vertical web portion secured therebetween intermediate the side edges thereof and extension beams of like construction therefor, a connecting splice for securing the said extension beams to said load beams comprising a series of longitudinally spaced alternating projections and recesses on said outer surfaces, a pair of cap plates each having complementary projections and recesses therein, a pair of bores through each of said flanges in spaced relation from the confronting ends thereof, and a pair of bores formed in each end of said plates registrable with said first mentioned bores, said plates being disposed in overlapping relation upon the aligned and adjacent ends of said beams and secured thereto with the recesses and projections of said plates engaging the projection and recesses of said beams respectively, aligned notches formed in the confronting ends of said web portions with one of said notches having secured therein a semi-circular transversely extending flange and a transversely extending shear plate receivable in said first mentioned notch and secured within the other notch.

5. In the combination of a trailer having a forward transversely extending horizontal load beam and a pair of rearwardly extending longitudinal load beams each connected thereto at one end thereof with said transversely extending load beam being pivotally secured to a tractor for movement about a horizontal axis extending transversely of said load beam, supporting wheel dollies each supporting the rear portion of one of said longitudinally extending load beams comprising a body beam extending longitudinally of said trailer, a horizontal support shaft journaled transversely through the midportion thereof, a pair of horizontal longitudinally extending shafts having one end of each rigidly secured in said body beam and the other end projecting from the ends of the latter, a pair of axle beams each having one of said shafts journaled transversely through the midportion thereof, two pairs of stub axles, each having an end thereof rigidly secured in one of the ends of said axle beams and the other end projecting therefrom, wheels rotatably mounted on each projecting end of said stub axles, and a support surface adapted to engage one of said longitudinally extending load beams pivotally mounted on said support shaft for pivotal movement thereabout.

References Cited in the file of this patent

UNITED STATES PATENTS

| | | |
|---|---|---|
| 1,049,252 | McDougall | Dec. 31, 1912 |
| 1,361,090 | O'Keefe | Dec. 7, 1920 |
| 1,419,160 | McKinnon | June 13, 1922 |
| 2,121,862 | Dodge | June 28, 1938 |
| 2,204,108 | Townsend | June 11, 1940 |
| 2,268,636 | Becker | Jan. 6, 1942 |
| 2,727,758 | Smith | Dec. 20, 1955 |
| 2,788,145 | Clark | Apr. 9, 1957 |
| 2,833,561 | Vaugoyeau | May 6, 1958 |
| 2,857,174 | Brown | Oct. 21, 1958 |
| 2,919,928 | Hoffer | Jan. 5, 1960 |

FOREIGN PATENTS

| | | |
|---|---|---|
| 1,059,018 | Germany | June 11, 1959 |